(12) United States Patent
Hoffart

(10) Patent No.: US 7,131,502 B1
(45) Date of Patent: Nov. 7, 2006

(54) IMPLEMENT MOUNTING SYSTEM

(76) Inventor: Ronald J. Hoffart, 755 2nd Ave. NW., West Fargo, ND (US) 58078

( * ) Notice: Subject to any disclaimer, the term of this patent is extended or adjusted under 35 U.S.C. 154(b) by 178 days.

(21) Appl. No.: 10/825,268

(22) Filed: Apr. 14, 2004

Related U.S. Application Data

(63) Continuation of application No. 10/622,961, filed on Jul. 18, 2003, now Pat. No. 6,827,155.

(51) Int. Cl.
*E02F 3/76* (2006.01)
(52) U.S. Cl. ...................... 172/821; 172/824
(58) Field of Classification Search ........ 172/810–834; 37/234–236
See application file for complete search history.

(56) References Cited

U.S. PATENT DOCUMENTS

| | | | |
|---|---|---|---|
| 2,059,431 A | 11/1936 | Barrett et al. .................. 37/144 |
| 2,792,650 A | 5/1957 | Kenyon ......................... 37/42 |
| 3,631,930 A | 1/1972 | Peterson ....................... 172/804 |
| 3,674,096 A | 7/1972 | Berg ............................ 172/805 |
| 3,690,386 A | 9/1972 | Magee ......................... 172/804 |
| 3,698,490 A | 10/1972 | King ........................... 172/803 |
| 3,913,684 A | 10/1975 | Casey et al. .................. 172/804 |
| 3,941,195 A | 3/1976 | Stedman ...................... 172/801 |
| 4,019,588 A | 4/1977 | Casey ......................... 172/804 |
| 4,221,282 A | 9/1980 | Wampfler ..................... 191/68 |
| 4,241,794 A | 12/1980 | Halterman, Jr. .............. 172/804 |
| 4,270,617 A | 6/1981 | Cantarella et al. .......... 172/821 |
| 4,405,019 A | 9/1983 | Frisbee ....................... 172/816 |
| RE31,642 E | 8/1984 | Asal et al. ................... 172/821 |
| 4,463,507 A | 8/1984 | Gaub ......................... 37/117.5 |
| 4,828,044 A | 5/1989 | Horsch et al. ............... 172/821 |
| 4,962,598 A | 10/1990 | Woolhiser et al. ............ 37/231 |
| 5,263,810 A | 11/1993 | Takekata et al. ............. 414/723 |
| 5,419,673 A | 5/1995 | Merhar ........................ 414/723 |
| 5,447,204 A | 9/1995 | Asal et al. ................... 172/821 |
| 5,634,523 A | 6/1997 | Kobayashi et al. .......... 172/818 |
| 5,692,855 A | 12/1997 | Burton ........................ 403/325 |
| 6,041,870 A | 3/2000 | Zimmerman et al. ....... 172/811 |
| 6,105,682 A | 8/2000 | Recker et al. .............. 172/811 |
| 6,247,540 B1 | 6/2001 | Clemen et al. ............. 172/818 |
| 6,273,198 B1 | 8/2001 | Bauer et al. ................ 172/825 |
| 2003/0140529 A1 | 7/2003 | Bloxdorft et al. ............. 37/266 |
| 2003/0217852 A1 | 11/2003 | Bernhardt et al. .......... 172/200 |

*Primary Examiner*—Victor Batson
(74) *Attorney, Agent, or Firm*—Michael S. Neustel

(57) ABSTRACT

An implement mounting system for providing a lightweight structure capable of moving along 3 main axes for use upon small to mid-sized tractors. The implement mounting system includes a support frame having a pair of side supports and a rear support, a ball joint attached to the rear support, and a support arm movably attached to the ball joint for rotating about 3 main axes. A brace member is attached between the support frame and the support arm for reducing the amount of side-to-side movement of the support arm. The ball joint is comprised of a ball-and-socket structure for providing various pivoting movements of the support arm.

17 Claims, 11 Drawing Sheets

IMPLEMENT MOUNTING SYSTEM

CROSS REFERENCE TO RELATED APPLICATIONS

I hereby claim benefit under Title 35, United States Code, Section 120 of U.S. patent application Ser. No. 10/622,961 filed Jul. 18, 2003 now U.S. Pat. No. 6,827,155. This application is a continuation of the Ser. No. 10/622,961 application. The Ser. No. 10/622,961 application is hereby incorporated by reference into this application.

Two other utility patent applications have been filed with the USPTO by the applicant identified by U.S. patent application Ser. Nos. 10/622,959 and 10/622,964. Both applications were filed on Jul. 18, 2003.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to implement mounting arrangements for tractors and similar vehicles, and more specifically it relates to an implement mounting system for providing a lightweight structure capable of moving along 3 main axes for use upon small to mid-sized tractors.

2. Description of the Related Art

Conventional implement mounting arrangements have been in use for years for mounting various types of implements to tractors and like vehicles. Implements mounted to these structures range from loaders, blades, belly blades, rollers, brushes and the like. A typical implement mounting arrangement is the front-end loader commonly utilized upon small to large tractors.

Another type of implement mounting arrangement is comprised of a belly structure that is attached beneath the frame of a tractor preferably capable of operating about various axes to provide lift, roll, pitch and yaw to an implement. The belly structure typically has a support frame with side members and a rear support, a pair of support arms pivotally extending forwardly from the rear support, and an attachment structure that is movably attached to the distal portions of the support arms by a connecting structure. The connecting structure sometimes rotatably positioned within the support arms to allow for "rolling" of the implement. A pair of vertical actuators are attached on opposing sides to the connecting structure to provide both lift and roll to the belly mounting structure. U.S. Pat. No. 6,059,048 illustrates a recently patented belly mounting structure design that has these features and the below inherent limitations.

The main problem with conventional belly mounting structures is that they require the user to mount the vertical actuators to the front portion of the tractor thereby interfering with attachment of a conventional front-end loader (conventional front-end loaders are attached to the front portion of the tractor frame). Another problem with conventional belly mounting structures is that they tend to be heavy and bulky since they have at least two support arms extending forwardly from the rear support. A further problem with conventional belly mounting structures is that they require the usage of heavy duty pivot joints and materials near the front portion thereof.

While these devices may be suitable for the particular purpose to which they address, they are not as suitable for providing a lightweight structure capable of moving along 3 main axes. Conventional implement mounting devices are bulky and difficult to utilize upon small to mid-sized tractors.

In these respects, the implement mounting system according to the present invention substantially departs from the conventional concepts and designs of the prior art, and in so doing provides an apparatus primarily developed for the purpose of providing a lightweight structure capable of moving along 3 main axes.

BRIEF SUMMARY OF THE INVENTION

In view of the foregoing disadvantages inherent in the known types of belly mounting structures now present in the prior art, the present invention provides a new implement mounting system construction wherein the same can be utilized for providing a lightweight structure capable of moving along 3 main axes for use upon small to mid-sized tractors.

The general purpose of the present invention, which will be described subsequently in greater detail, is to provide a new implement mounting system that has many of the advantages of the belly mounting structures mentioned heretofore and many novel features that result in a new implement mounting system which is not anticipated, rendered obvious, suggested, or even implied by any of the prior art belly mounting structures, either alone or in any combination thereof.

To attain this, the present invention generally comprises a support frame having a pair of side supports and a rear support, a ball joint attached to the rear support, and a support arm movably attached to the ball joint for rotating about 3 main axes. A brace member is attached between the support frame and the support arm for reducing the amount of side-to-side movement of the support arm. The ball joint is comprised of a ball-and-socket structure for providing various pivoting movements of the support arm.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an implement mounting system that will overcome the shortcomings of the prior art devices.

A second object is to provide an implement mounting system for providing a lightweight structure capable of moving along 3 main axes for use upon small to mid-sized tractors.

Another object is to provide an implement mounting system that may be utilized upon various types and sizes of vehicles.

An additional object is to provide an implement mounting system that is capable of supporting various types of implements such as but not limited to a belly blade, plow, a roller and a brush.

A further object is to provide an implement mounting system that does not interfere with a front-end loader attached to a tractor.

Another object is to provide an implement mounting system that is comprised of a simple structure and simple to attach to a tractor.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
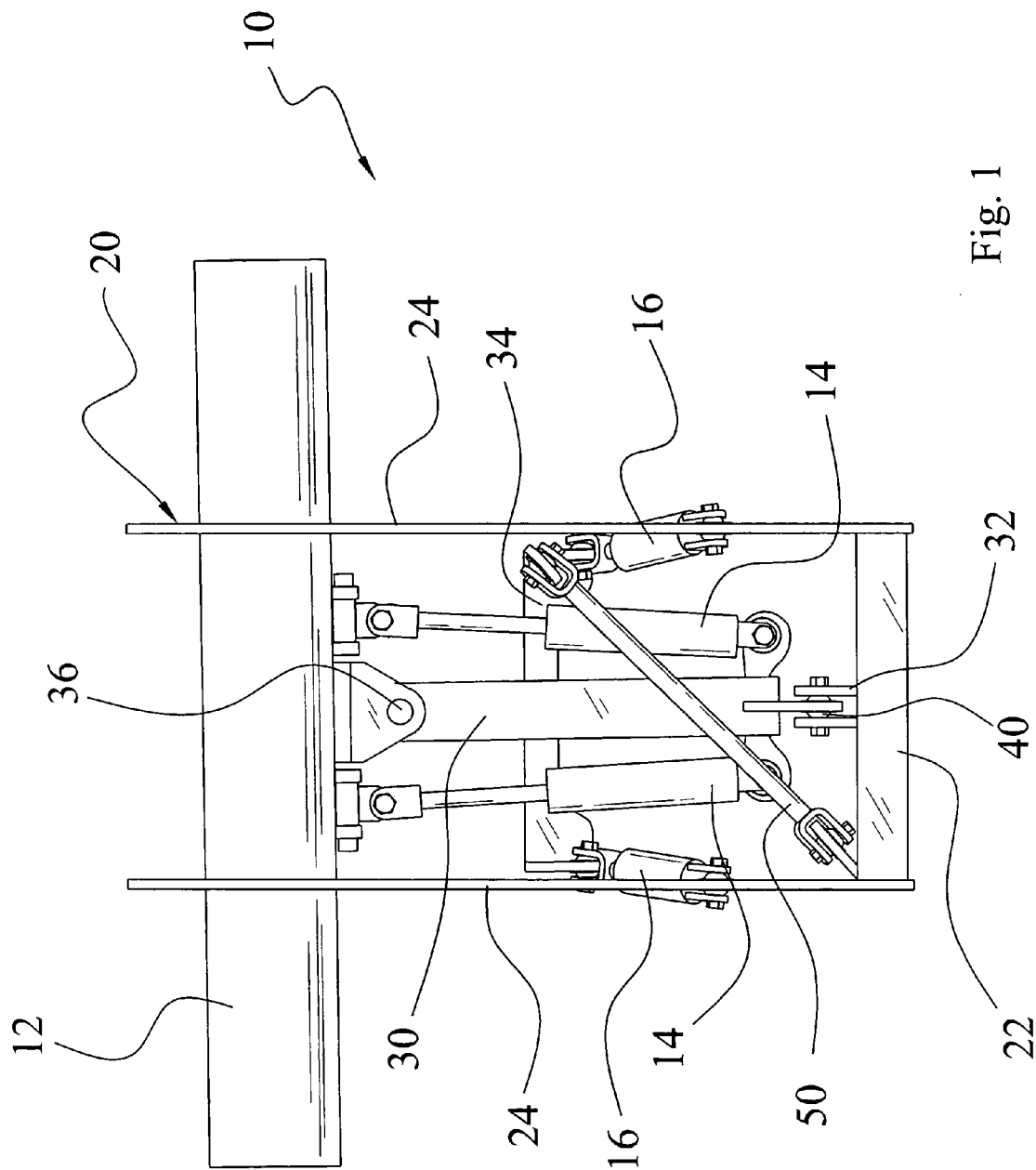
FIG. 1 is a top view of the present invention.

Turning now descriptively to the drawings, in which similar reference characters denote similar elements throughout the several views, FIGS. 1 through 11 illustrate an implement mounting system 10, which comprises a support frame 20 having a pair of side supports 24 and a rear support 22, a ball joint 40 attached to the rear support 22, and a support arm 30 movably attached to the ball joint 40 for rotating about 3 main axes. A brace member 50 is attached between the support frame 20 and the support arm 30 for reducing the amount of side-to-side movement of the support arm 30. The ball joint 40 is comprised of a ball-and-socket structure for providing various pivoting movements of the support arm 30.

B. Support Frame

As shown in FIGS. 1 through 6 of the drawings, a support frame 20 is preferably utilized with the present invention. The support frame 20 is preferably attached to the belly of a tractor or other related vehicle. The support frame 20 is preferably formed so as to not interfere with a front-end loader or other attachment to the front of the tractor. The support frame 20 may have various structures capable of mounting to a tractor frame as can be appreciated.

Figure 2:
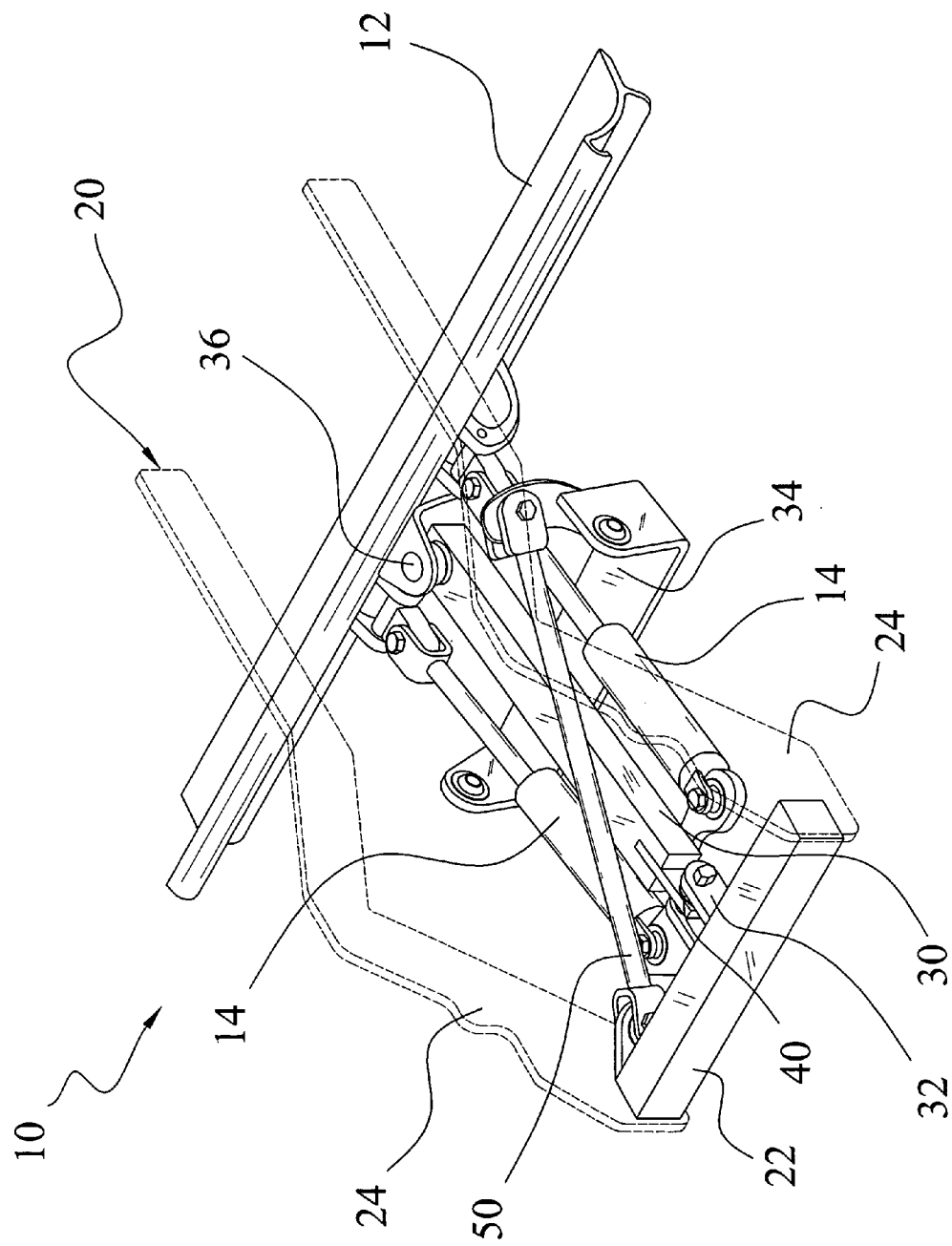
FIG. 2 is an upper perspective view of the present invention.

As best shown in FIGS. 1 and 2 of the drawings, the support frame 20 preferably has a pair of side supports 24 and a rear support 22 attached between the rear ends of the side supports 24. The side supports 24 are preferably attached to the lower frame of the tractor utilizing conventional fasteners such as but not limited to bolts and the like. Various other bracing and reinforcement structures may be utilized to construct the support frame 20 other than shown in the attached drawings.

C. Ball Joint

Figure 7:
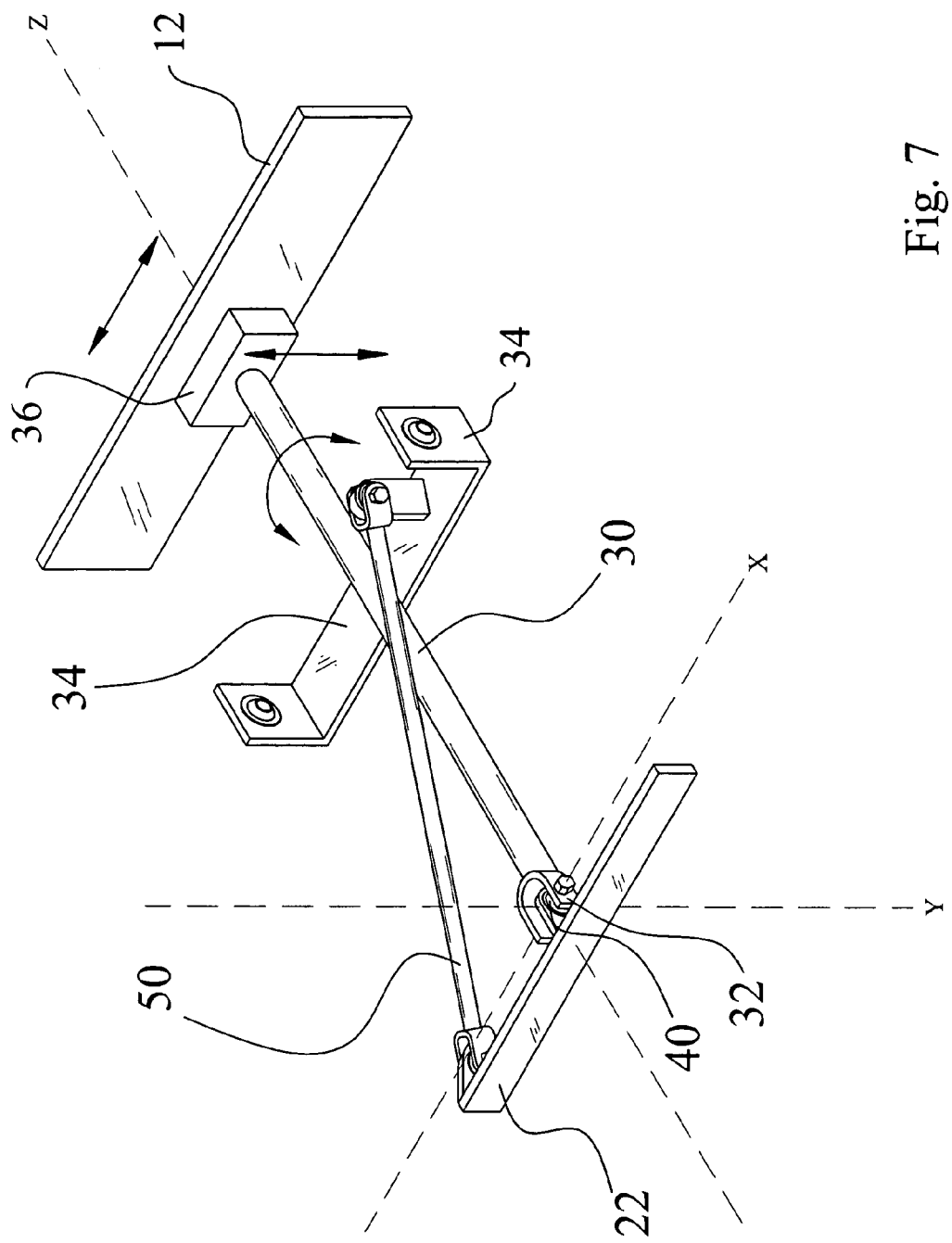
FIG. 7 is an upper perspective view of the present invention.

As shown in FIGS. 1 through 4 of the drawings, a ball joint 40 is provided for movably supporting the support arm 30. The ball joint 40 is preferably comprised of a ball-and-socket structure for providing various pivoting movements of the support arm 30. FIG. 7 illustrates the three main axes of pivoting (X, Y and Z), however the ball joint 40 inherently allows pivoting along various other axes.

The ball joint 40 may be attached directly to the tractor frame, however the ball joint 40 is preferably attached directly to the support frame 20. The ball joint 40 may be attached to the rear support 22 of the support frame 20 as shown in FIGS. 1 through 4 of the drawings.

Figure 8:
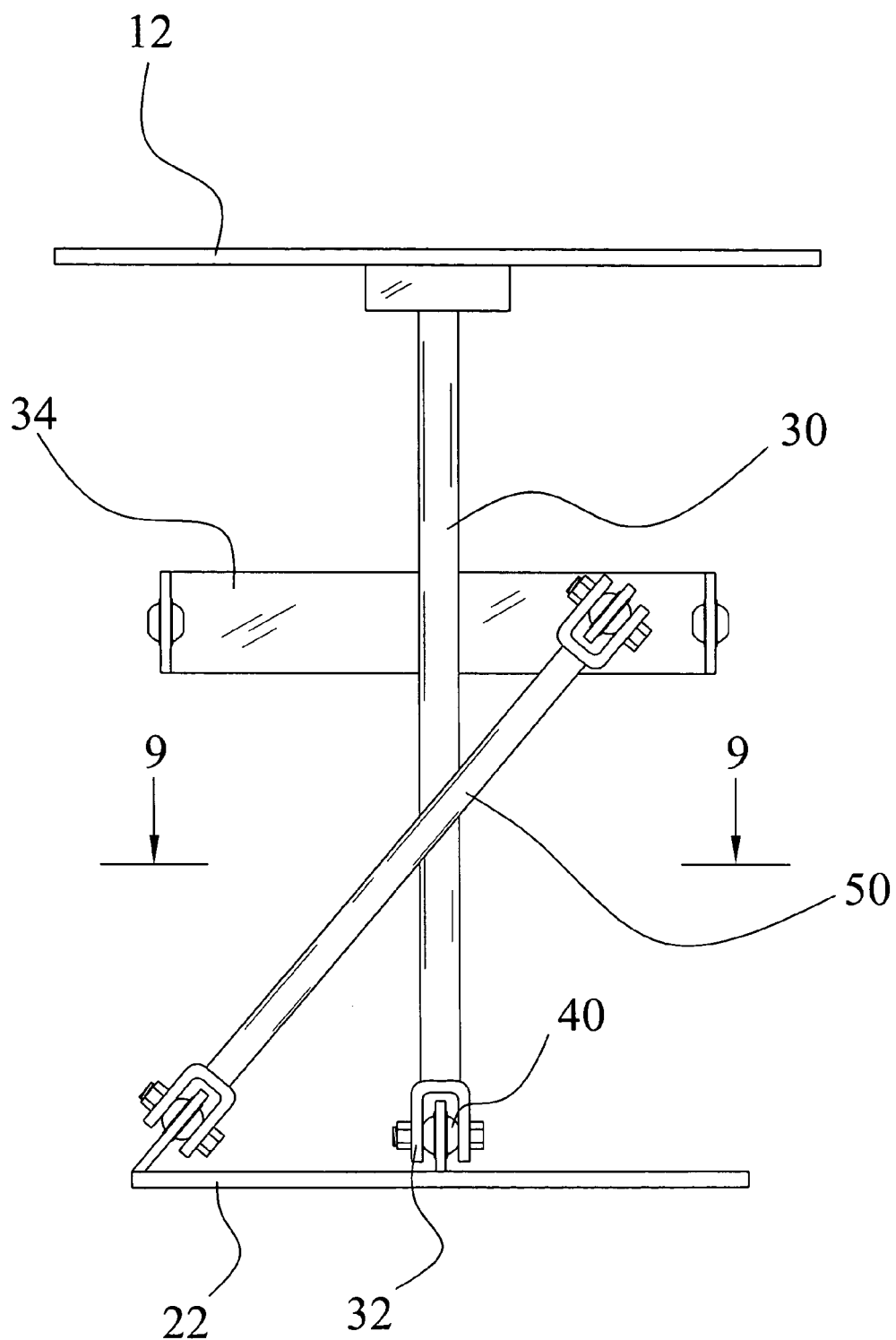
FIG. 8 is a top view of the present invention.
Figure 9:
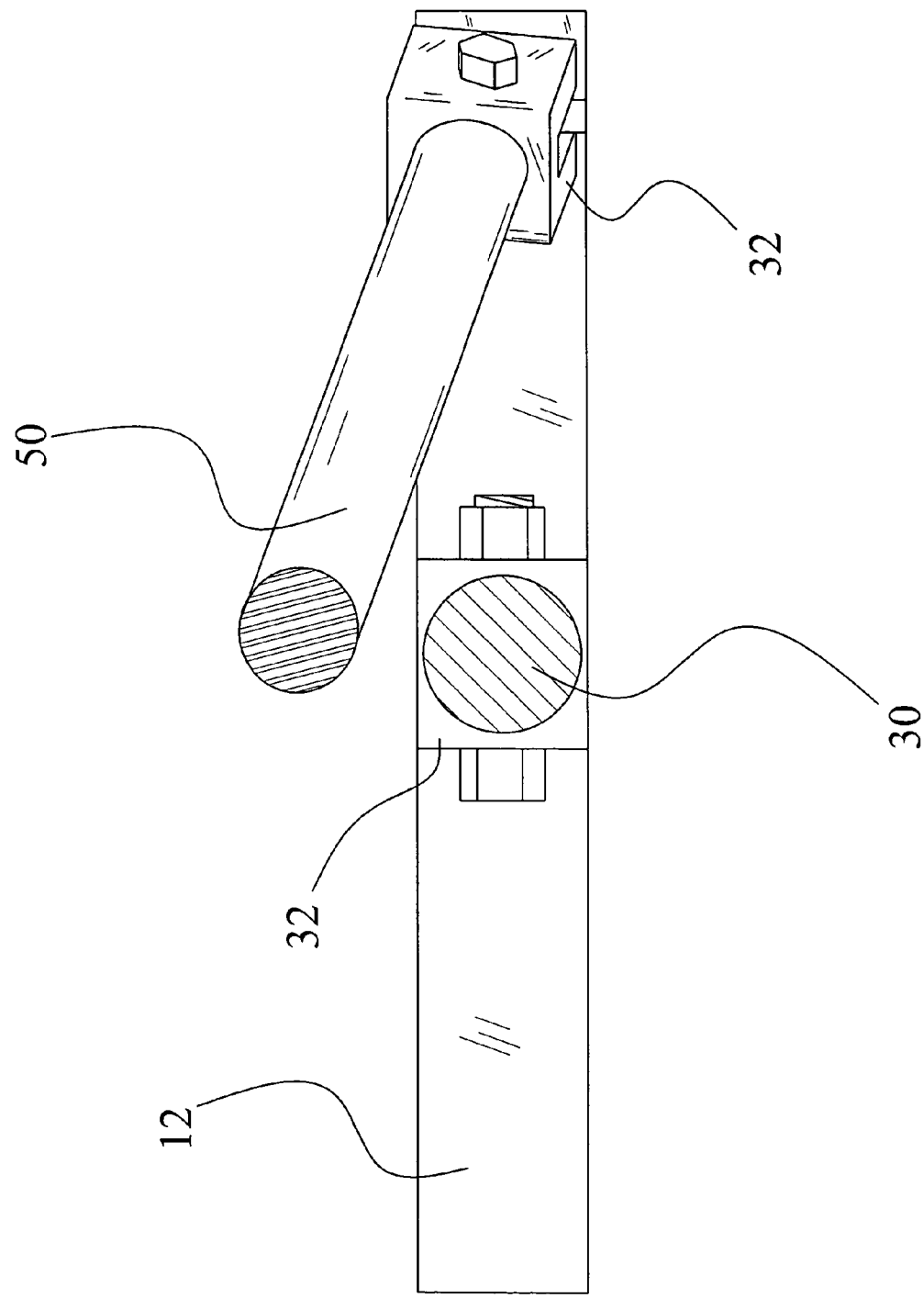
FIG. 9 is a cross sectional view taken along line 9—9 of FIG. 8.

A cuff structure 32 extending from the rear support 22 preferably engages the ball joint 40 via a pin member as shown in FIGS. 1 through 6 of the drawings. Alternatively, the cuff structure 32 may be attached to the first end of the support arm 30 as shown in FIGS. 7 and 8 of the drawings. The ball joint 40 allows the support arm 30 to have three main movements: lift, roll and yaw.

Figure 3:
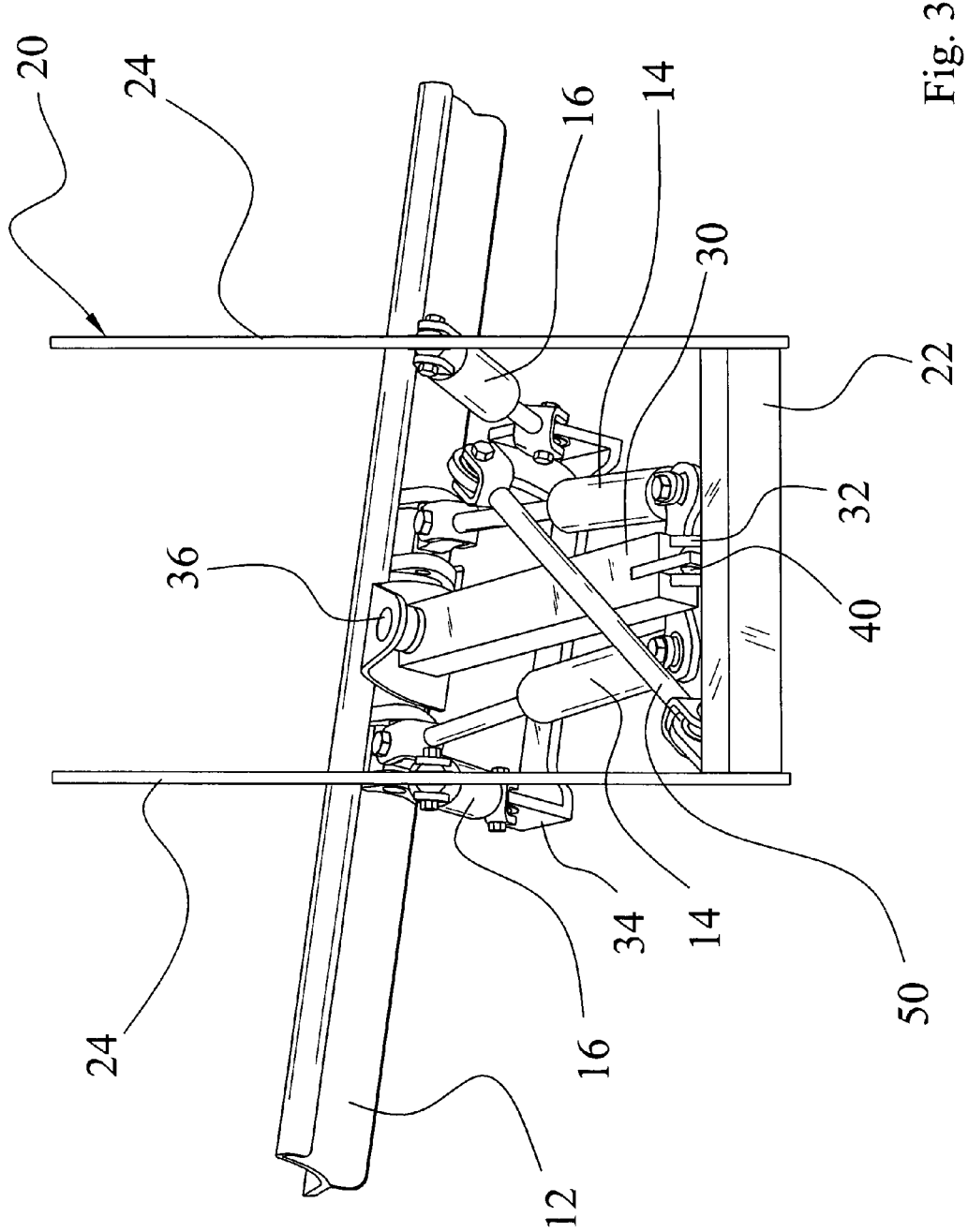
FIG. 3 is a rear perspective view of the present invention illustrating the rolling of the implement upwardly on the left side.
Figure 4:
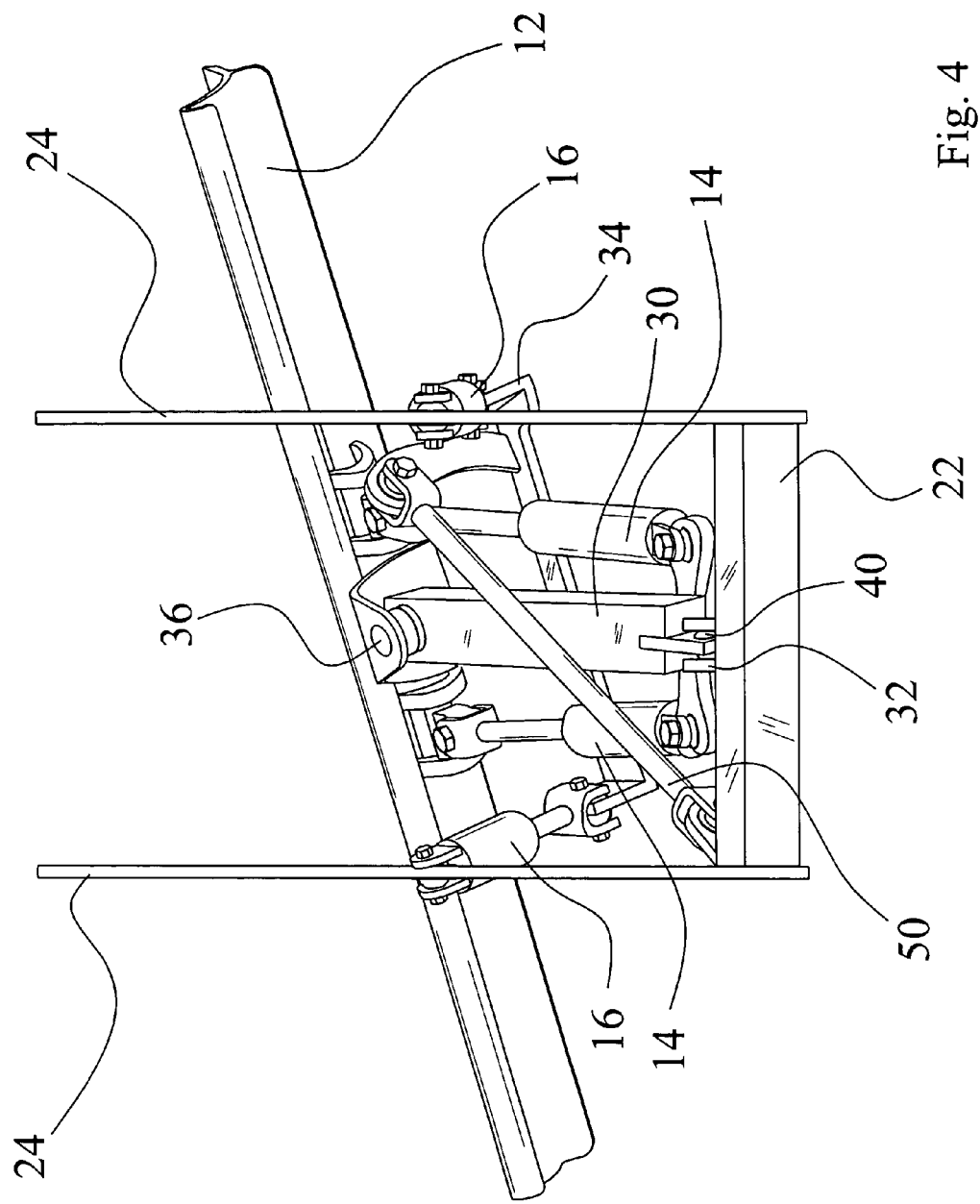
FIG. 4 is a rear perspective view of the present invention illustrating the rolling of the implement upwardly on the right side.

The ball joint 40 is preferably centrally positioned along the rear support 22 as best shown in FIGS. 3 and 4 of the drawings. However, the ball joint 40 may be positioned at various other locations along the rear support 22.

D. Support Arm

The support arm 30 is an elongate structure having a first end and a second end as best shown in FIGS. 1 and 8 of the drawings. The first end of the support arm 30 is attached to the ball joint 40 as further shown in FIGS. 1 and 8 of the drawings.

The second end receives an attachment structure for an implement 12. The attachment structure is capable of supporting various types of implements 12 such as but not limited to blades, plows, brushes and the like. For example, a front joint 36 is preferably attached to the second end of the support arm 30 for allowing pivoting of the implement 12 independently of the movement of the support arm 30 such as pitch and yaw.

E. Brace Member

A brace member 50 is provided for stabilizing the horizontal side-to-side movements of the support arm 30. The brace member 50 is preferably attached between the support frame 20 and the support arm 30. However, the brace member 50 may be directly attached to the tractor frame.

The brace member 50 is preferably attached to the support frame 20 at a vertical height substantially similar to the ball joint 40 as shown in FIGS. 2 and 7 of the drawings. This allows for the uninterrupted vertical movement of the support arm 30 while limiting the horizontal movement of the support arm 30.

Figure 10:
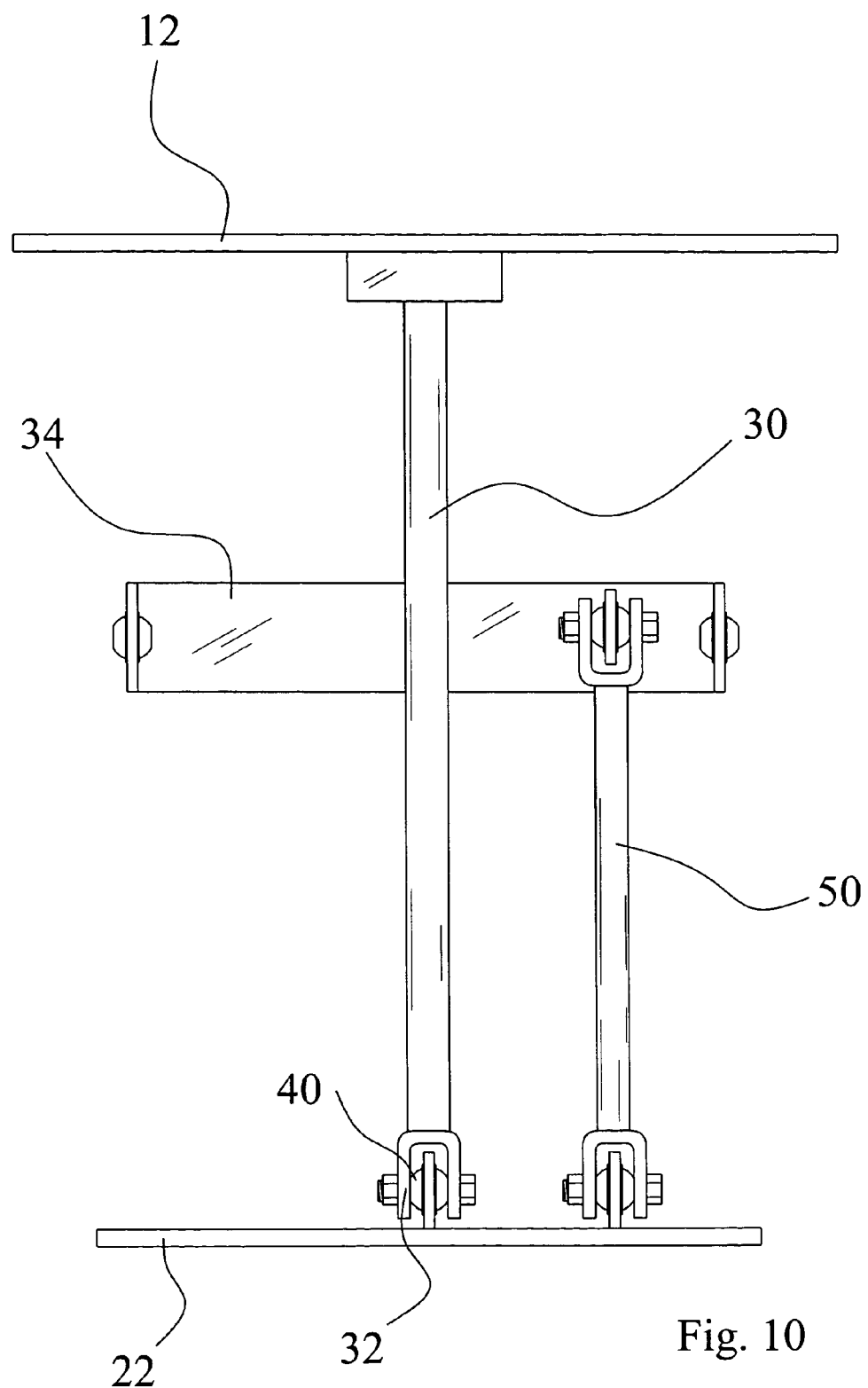
FIG. 10 is a top view of the present invention showing the brace member extending substantially parallel with respect to the support arm.
Figure 11:
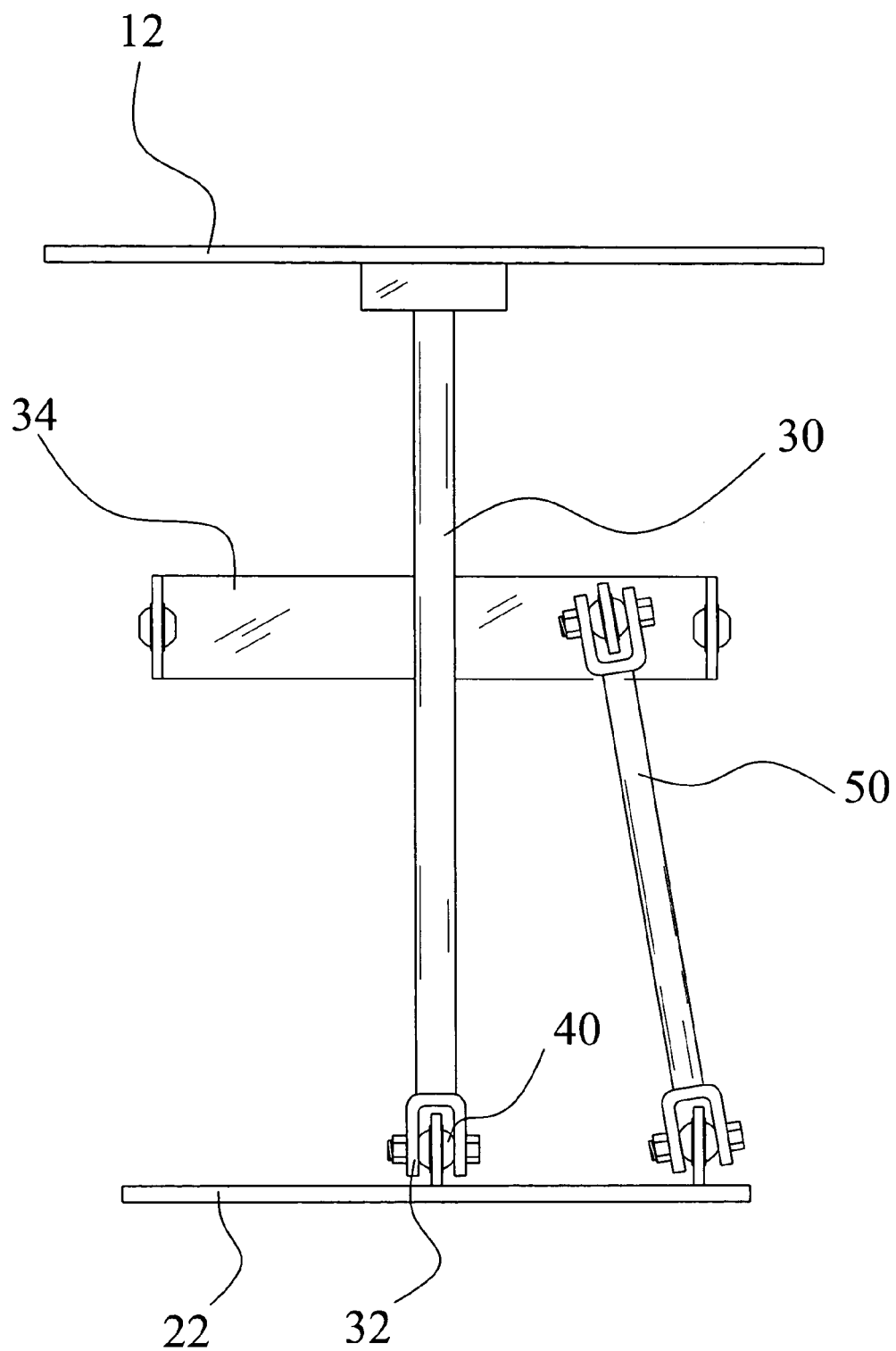
FIG. 11 is a top view of the present invention showing the brace member extending at an angle with respect to the brace member.

The brace member 50 has an angle with respect to the support arm 30 for reducing side-to-side movement of the support arm 30 as best shown in FIGS. 8, 10 and 11 of the drawings. The angle between the support arm 30 and the brace member 50 is preferably less than 75 degrees (e.g. 0 degrees to 74 degrees), though various other angles may be utilized.

As shown in FIGS. 1 through 4 of the drawings, the brace member 50 is preferably attached to the support frame 20 via a ball-and-socket joint. The brace member 50 is also preferably attached to the support arm 30 via a ball-and-socket joint.

F. Cross Member

A cross member 34 is preferably attached transversely to the support arm 30 as shown in FIGS. 1 through 8 of the drawings. The cross member 34 has an elongate structure and has two opposing ear structures for receiving a pair of vertical actuators 16 for allowing control of the lift and roll movements. The cross member 34 is preferably attached to a central location upon the support arm 30 as shown in FIGS. 1 through 4 of the drawings.

The brace member 50 is attached near a distal end of the cross member 34, wherein the distal end of the cross member 34 is on an opposite side of the support arm 30 of where the brace member 50 is attached to the support frame 20 as shown in FIGS. 1 and 8 of the drawings. The brace member 50 may be attached to a bracket member that is attached to the cross member 34 as best shown in FIG. 4 of the drawings.

G. Actuators

As shown in FIG. 1 of the drawings, a pair of horizontal actuators 14 are preferably utilized within the present invention that control the yaw and pitch of the implement 12 attached to the support arm 30. The horizontal actuators 14 are preferably attached to the support arm 30 near the first end thereof as shown in FIG. 1 of the drawings.

A pair of vertical actuators 16 are preferably attached between the side supports 24 of the support frame 20 (or the tractor frame) and the cross member 34 that control the lift and roll of the implement 12 attached to the support arm 30. The actuators 14, 16 are preferably connected with ball-and-socket joint structures to allow for free movement of the support arm 30. The actuators 14, 16 are also preferably comprised of hydraulic cylinders, however various other actuator structures may be utilized such as but not limited to electrical actuators.

H. Operation

In use, the support frame 20 is attached to a lower portion of a tractor frame. The desired implement 12 is attached to the distal second end of the support arm 30 as desired. The actuators are fluidly connected to the hydraulic system of the tractor or an independent hydraulic system.

Figure 5:
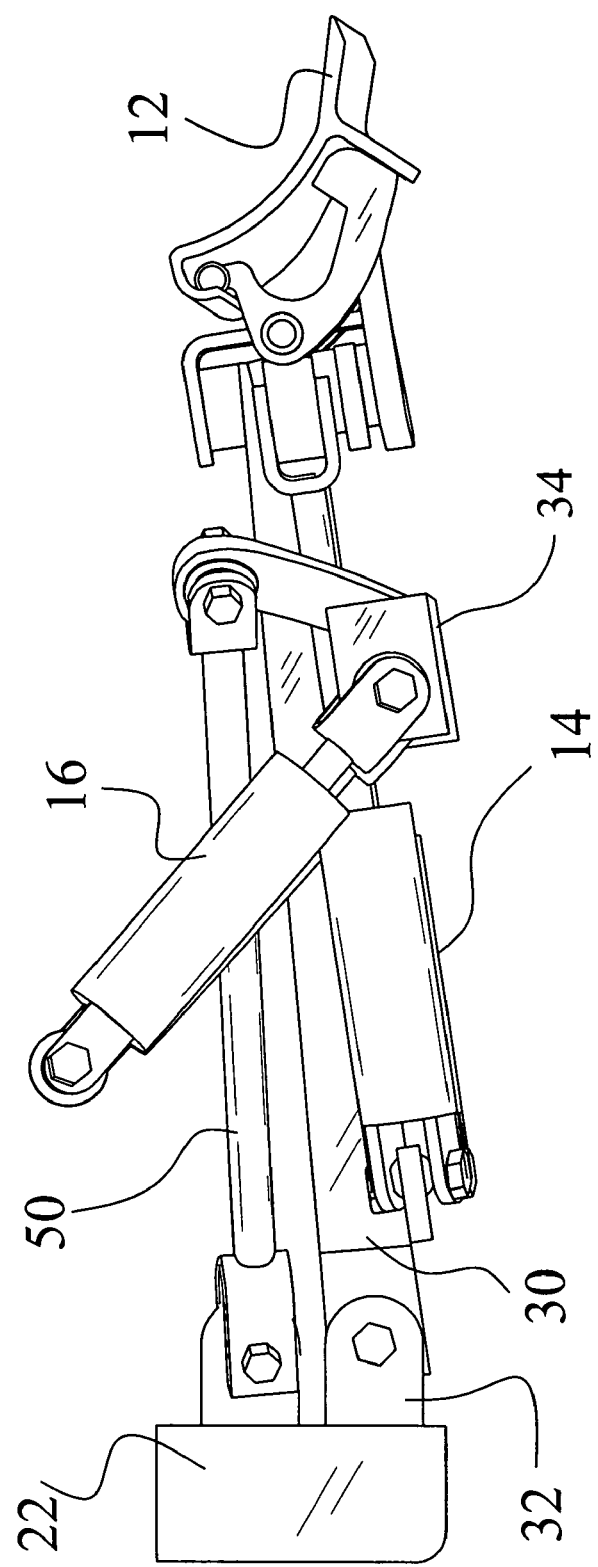
FIG. 5 is a side view of the present invention in an elevated position.
Figure 6:
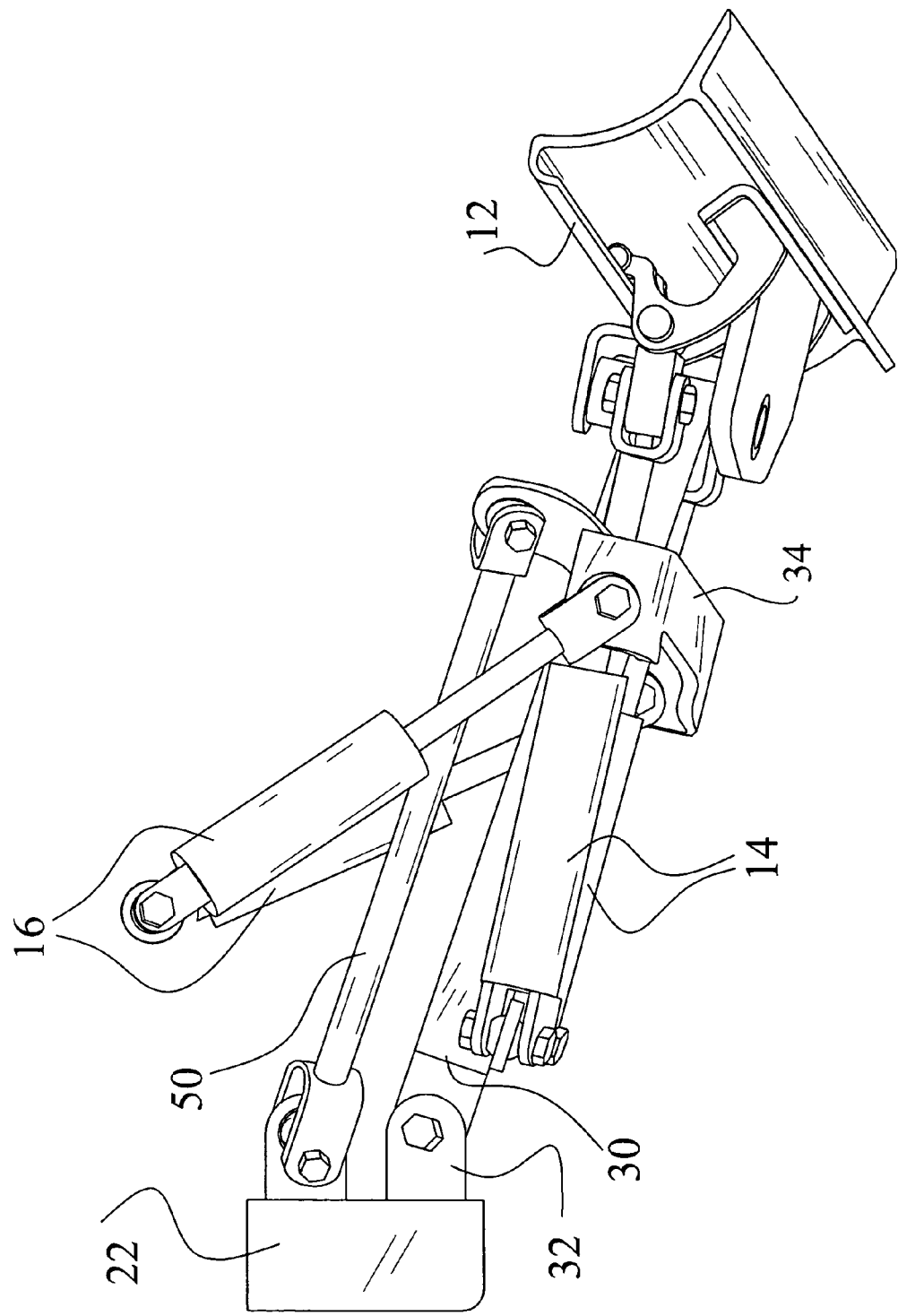
FIG. 6 is a side view of the present invention in a lowered position.

If the user desires to lift/lower the implement 12, the vertical actuators 16 are retracted/extended accordingly as shown in FIGS. 5 and 6 of the drawings. As the implement 12 is lifted/lowered, the support arm 30 freely pivots along the X axis of the ball joint 40 as shown in FIG. 7 of the drawings. As the support arm 30 is lifted/lowered, the brace member 50 will apply a side-to-side horizontal force upon the support arm 30 which the ball joint 40 will allow the support arm 30 to accordingly move a finite distance to the side (pivoting along the Y axis of FIG. 7). To reduce the amount of side-to-side movement caused by the brace member 50 during lifting/lowering, a longer brace member 50 is desired.

As shown in FIGS. 3 and 4 of the drawings, if the user desires to roll the implement 12, the vertical actuators 16 are retracted/extended accordingly (usually by retracting one actuator and extending another actuator, however retracting/extending only one actuator will accomplish the same). As the implement 12 is lifted/lowered, the support arm 30 freely pivots along the Z axis of the ball joint 40 as shown in FIG. 7 of the drawings.

If the user desires to change the pitch or yaw of the implement 12, the horizontal actuators 14 are retracted/extended accordingly. Control of the pitch and yaw of the implement 12 does not affect the support arm 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An implement mounting system, comprising:
   a support frame;
   a ball joint attached to said support frame;
   a support arm having a first end and a second end, wherein said first end is attached to said ball joint and wherein said second end receives an attachment structure for an implement; and
   a brace member attached between said support fame and said support arm, wherein said brace member is attached to a cross member, wherein said cross member is attached transversely to said support arm, wherein said cross member is attached to a central location upon said support arm.

2. The implement mounting system of claim 1, wherein said ball joint is comprised of a ball-and-socket structure for providing various pivoting movements of said support arm.

3. The implement mounting system of claim 1, wherein said brace member has an angle with respect to said support arm, wherein said angle is less tan seventy-five degrees.

4. The implement mounting system of claim 1, wherein said brace member has an angle with respect to said support arm, wherein said angle is less than seventy-five degrees and greater than ten degrees.

5. The implement mounting system of claim 1, wherein said brace member is attached to said support frame via a ball-and-socket joint.

6. The implement mounting system of claim 5, wherein said brace member is attached to said support arm via a ball-and-socket joint.

7. The implement mounting system of claim 1, wherein said cross member receives a pair of vertical actuators for allowing control of the lift and roll.

8. The implement mounting system of claim 1, wherein said brace member is attached near a distal end of said cross member.

9. The implement mounting system of claim 8, wherein said distal end of said cross member is on an opposite side of said support arm of where said brace member is attached to said support frame.

10. The implement mounting system of claim 1, wherein said brace member is attached to a rear support of said support frame.

11. The implement mounting system of claim 1, wherein said brace member is attached to a side support of said support frame.

12. An implement mounting system for supporting an implement utilized upon a tractor, comprising:
　a ball joint;
　a support arm having a first end and a second end, wherein said first end is attached to said ball joint and wherein said second end receives an attachment structure for an implement; and
　a brace member attached to said support arm, wherein said brace member is attached to a cross member, wherein said cross member is attached transversely to said support arm, wherein said cross member is attached to a central location upon said support arm.

13. The implement mounting system of claim 12, wherein said ball joint is comprised of a ball-and-socket structure for providing various pivoting movements of said support arm.

14. The implement mounting system of claim 12, wherein said brace member has an angle with respect to said support arm, wherein said angle is less than seventy-five degrees.

15. The implement mounting system of claim 12, wherein said brace member has an angle with respect to said support arm, wherein said angle is less than seventy-five degrees and greater than ten degrees.

16. The implement mounting system of claim 12, wherein said brace member is attached to said support arm via a ball-and-socket joint.

17. The implement mounting system of claim 12, wherein said cross member receives a pair of vertical actuators for allowing control of the lift and roll.

\* \* \* \* \*